E. REED.
ROLL.
APPLICATION FILED MAR. 31, 1921.

1,384,806.

Patented July 19, 1921.

INVENTOR
Edwin Reed
by Wright Brown Quinby May
ATTORNEYS

UNITED STATES PATENT OFFICE.

EDWIN REED, OF ANDOVER, MASSACHUSETTS.

ROLL.

1,384,806.

Specification of Letters Patent.  Patented July 19, 1921.

Application filed March 31, 1921. Serial No. 457,292.

*To all whom it may concern:*

Be it known that I, EDWIN REED, a citizen of the United States, residing at Andover, in the county of Essex and State of Massachusetts, have invented new and useful Improvements in Rolls, of which the following is a specification.

This invention relates chiefly to rolls employed in spinning silk and other textile material, the roll in which the invention is embodied being one of a pair of rolls adapted to act in a well known manner, on textile fibers passing therebetween. The roll to which the invention relates is composed of a discoidal body or center, and a facing forming the periphery of the roll and having a resiliently yielding tread surface bearing on fibers passing between the roll and a companion roll.

A desirable facing is provided by assembling concentric rings of rubber, the outer ring being composed of relatively soft and compressible rubber, forming the tread of the roll, and an inner ring of hard rubber interposed between the outer ring and the rigid body or center, the rings being assembled while unvulcanized, and united by the process of vulcanization.

The object of the invention is to improve the structure of the roll with reference to the facing, and to the means for attaching the same to the rigid body or center.

The invention is embodied in the improvements which I will now proceed to describe and claim.

Of the accompanying drawings forming a part of this specification,—

The same reference characters indicate the same parts in all of the figures.

Figure 1:
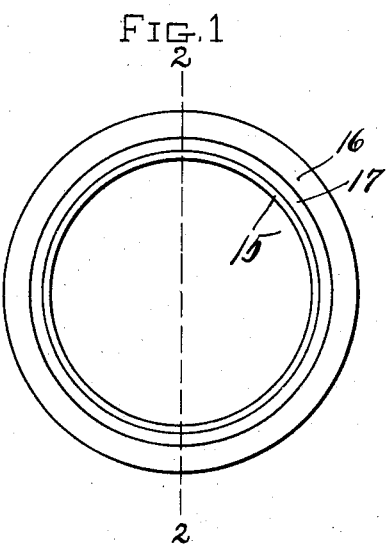
Figure 1 is a side view of the facing of a roll embodying the invention.
Figure 2:
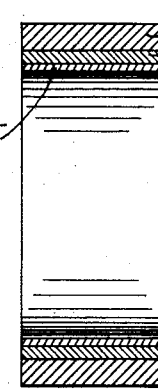
Fig. 2 is a section on line 2—2 of Fig. 1.
Figure 3:
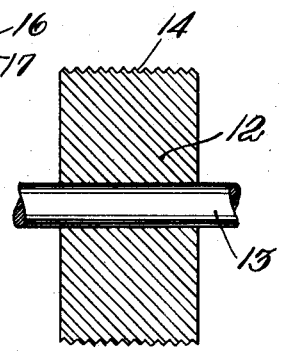
Fig. 3 is a section on line 3—3 of Fig. 5.

In the drawings, 12 represents a discoidal roll body or center of rigid material, preferably such as cast iron, attached to a shaft 13, adapted to rotate in suitable bearings.

Figure 5:
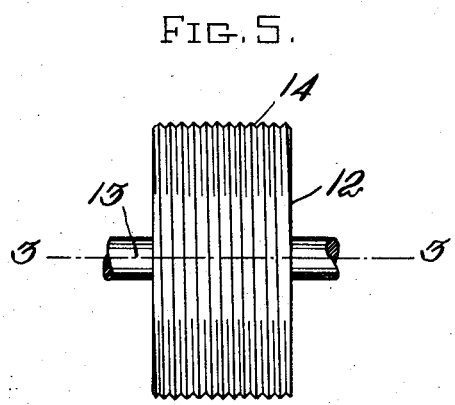
Fig. 5 is a side view of the body or center.

The periphery of the body is corrugated or roughened, to indent a soft rubber inner layer with which the facing hereinafter described is provided, the corrugations being preferably the convolutions of a screw thread 14, cut in the periphery of the body, the entire periphery being screw-threaded, as indicated by Fig. 5, so that the said facing may be screwed upon the body and thus secured to the latter.

The facing is provided by assembling two concentric rings of unvulcanized rubber, viz., an inner ring 17 of rubber, adapted to be rendered hard by vulcanization, and an outer ring 16, which remains relatively soft and resiliently yielding when vulcanized. The rings are assembled before vulcanization, and are united to each other by the usual vulcanizing process, which also renders the inner ring suitably hard.

Figure 4:
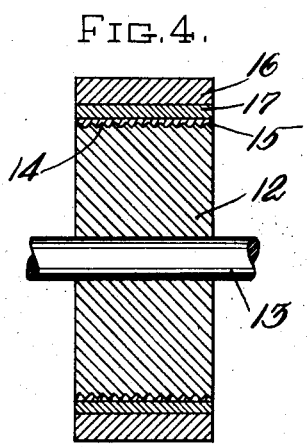
Fig. 4 is a sectional view of the entire roll.

To adapt the facing for attachment to the corrugated body, I secure to the inner surface of the hard rubber inner ring 17, a thin layer 15 of soft rubber vulcanized to the inner ring, and of sufficient softness and thickness to be indented by the corrugations of the roll body. The facing thus constructed may be secured to the body 12, as a nut is secured to a bolt, that is to say, by applying the facing to one side of the body, and simultaneously pressing it edgewise and rotating it. The body thread 14 is thus caused to indent the inner surface of the soft rubber layer 15, the screwing operation being continued until the facing surrounds the body, as indicated by Fig. 4.

The described screwing operation results in the formation by the external body thread 14, of a complemental internal thread in the layer 15.

When the facing has been rendered useless by wear, it may be unscrewed from the body and replaced by another facing.

Figure 6:
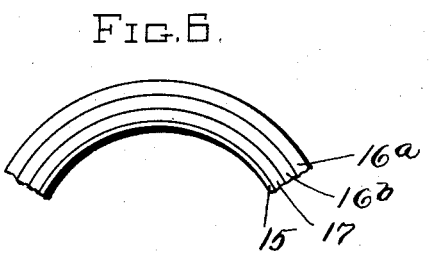
Fig. 6 is a fragmentary view, similar to a portion of Fig. 1, showing the outer ring made of two layers of rubber, one layer being softer than the other.

As shown by Fig. 6, the soft rubber outer ring may be composed of layers 16ª and 16ᵇ, the latter being softer than the former and constituting a cushioning layer, the relative hardnes of the tread layer 16ª preventing fibrous threads from sinking into it.

The hard rubber inner ring, internally united to the soft rubber outer ring by vulcanization, and in close proximity to the body 12, is enabled, by the soft rubber layer 15, which is indented by corrugations on the body, to adhere closely to the body and to prevent displacement or creeping of the tread face. If the facing were composed of a single ring of rubber of the softness or resilience required at the tread, and the inner surface of the said single ring were engaged with the corrugated periphery of the roll, the tread face would have a tendency to creep. This tendency is prevented by the hard rubber inner ring, in close proximity to the corrugated periphery of the roll body, and united to the latter as described.

I claim:

1. A roll comprising a discoidal body or center having a corrugated periphery, and an annular facing comprising an outer ring of relatively soft rubber constituting a resiliently yielding tread, an inner ring of hard rubber vulcanized to the outer ring, and an annular layer of soft rubber vulcanized to the inner surface of the inner ring and conforming to said corrugated periphery.

2. A roll comprising a discoidal body or center having a screw-threaded periphery, and an annular facing comprising an outer ring of relatively soft rubber constituting a resiliently yielding tread, an inner ring of hard rubber vulcanized to the outer ring, and an annular layer of soft rubber vulcanized to the inner surface of the inner ring, and adapted to be indented by the said threaded periphery, the facing being screwed upon the body 3. An annular facing for a corrugated roll body or center, comprising an outer ring of relatively soft rubber constituting a resiliently yielding tread, an inner ring of hard rubber vulcanized to the outer ring, and an annular layer of soft rubber vulcanized to the inner surface of the inner ring, and adapted to conform to corrugations on said body.

In testimony whereof I have affixed my signature.

EDWIN REED.